United States Patent [19]

Chu

[11] Patent Number: 4,720,356

[45] Date of Patent: Jan. 19, 1988

[54] PHOTOCHROMIC COMPOSITION RESISTANT TO FATIGUE

[75] Inventor: Nori Y. C. Chu, Southbridge, Mass.

[73] Assignee: American Optical Corporation, Southbridge, Mass.

[21] Appl. No.: 58,629

[22] Filed: Jun. 4, 1987

Related U.S. Application Data

[63] Continuation of Ser. No. 843,792, Mar. 18, 1986, abandoned, which is a continuation of Ser. No. 696,452, Jan. 31, 1985, abandoned, which is a continuation-in-part of Ser. No. 497,263, May 23, 1983, abandoned, which is a continuation-in-part of Ser. No. 360,455, Mar. 22, 1982, Pat. No. 4,440,672.

[51] Int. Cl.[4] .......................... G02B 5/23; C08K 5/35

[52] U.S. Cl. ........................................ 252/586; 8/506; 350/438; 524/89; 524/90

[58] Field of Search ............................ 8/506; 350/438; 252/586; 524/89, 90, 96, 97, 100, 102

[56] References Cited

U.S. PATENT DOCUMENTS

| | | | |
|---|---|---|---|
| 3,212,898 | 10/1965 | Cerreta . | |
| 3,666,352 | 5/1972 | Wagner et al. | 350/160 |
| 4,046,737 | 9/1977 | Holt | 524/103 |
| 4,049,647 | 9/1977 | Holt | 524/102 |
| 4,215,010 | 7/1980 | Hovey | 544/71 |
| 4,289,497 | 9/1981 | Hovey | 544/71 |
| 4,342,668 | 8/1982 | Hovey et al. | 352/586 |
| 4,440,672 | 4/1984 | Chu | 252/586 |

FOREIGN PATENT DOCUMENTS

| | | | |
|---|---|---|---|
| 49-53180 | 5/1974 | Japan | 252/586 |
| 60-42482 | 3/1985 | Japan | 252/586 |

OTHER PUBLICATIONS

Shute, Raymond, "Antioxidants", *Modern Plastics Encyclopedia,* pp. 102-103, (1983-1984).

Li, S. S., "Ultraviolet Stabilizers", *Modern Plastics Encyclopedia,* pp. 174-177, (1983-1984).

Patel, A., "Antioxidants", *Modern Plastics Encyclopedia,* pp. 106-107, (1984-1985).

Stretanski, J. A. "Ultraviolet Stabilizers", *Modern Plastics Encyclopedia,* pp. 179-180, (1984-1985).

*Primary Examiner*—Christopher Henderson

*Attorney, Agent, or Firm*—Dike, Bronstein, Roberts, Cushman & Pfund

[57] ABSTRACT

An organic photochromic composition comprising spiro [indoline-2,3'-[3H]-naphth [2,1-b] [1,4] oxazine] dye (spirooxazine dye) and unconventional ultraviolet stabilizers. The ultraviolet stabilizers improve the light fatigue resistance of the spirooxazine (S.O.) dye and will not hinder the photocolorability of the photochromic composition. The unconventional ultraviolet stabilizers belong to the class of hindered amine light stabilizers (HALS) and excited state quenchers.

19 Claims, No Drawings

PHOTOCHROMIC COMPOSITION RESISTANT TO FATIGUE

CROSS-REFERENCE TO RELATED APPLICATIONS

This application is a continuation of Ser. No. 843,792, filed Mar. 18, 1986, now abandoned, which is a continuation of Ser. No. 696,452, filed Jan. 31, 1985, now abandoned, which is a continuation-in-part of Ser. No. 497,263, filed May 23, 1983, now abandoned, which is a continuation-in-part of Ser. No. 360,455 now U.S. Pat. No. 4,440,672.

BACKGROUND OF THE INVENTION

The invention relates to a photochromic composition, and more particularly to an organic photochromic composition comprising spiro [indoline-2,3'-[3H]-naphth [2,1-b] [1,4] oxazine](S.O.) dye and unconventional ultraviolet (UV) stabilizers.

Compounds which undergo reversible photo-induced color changes are termed photochromic compounds. When subjected to ultraviolet light or visible irradiation, these photochromic compounds change their transmission. They subsequently revert to their original color state when they are subjected to a different wavelength of radiation or when the initial light source is removed.

Although the organic photochromic materials have been known for over 50 years, they have not had widespread industrial or commercial use. This is primarily due to the irreversible decomposition phenomenon, generally known as light fatigue. Repeated exposure to light causes the photochromic materials to lose their photochromism.

It is thought that light or heat or both light and heat are responsible for the photodecomposition of organic photochromic compounds. Thus, many people have tried to increase the light fatigue resistance of the compounds by adding numerous conventional antioxidants or ultraviolet light absorbers. For example, U.S. Pat. No. 3,212,898 teaches the use of conventional UV absorbers such as benzophenone and benzotriazole to increase the photochromic life of photochromic benzospiropyran compounds. Similarly, U.S. Pat. No. 3,666,352 teaches the use of conventional UV light absorbers in photochromic mercury thiocarbazonate lenses, transparent to radiation of wavelengths greater than 4200 Angstrom units and opaque to radiation of wavelengths less than 4200 Angstrom units, in order to substantially increase the durability of the lense against photochemical degradation.

One class of organic photochromic compounds, spiro [indoline-2,3'-[3H]-naphth [2,1-b] [1,4] oxazine] dyes (S.O. dyes) are known to have good light fatigue resistance. In general, the light fatigue resistance of the spirooxazine compounds is about 100 times better than the closely related spiropyrans. This class of photochromic compounds has been disclosed in U.S. Pat. Nos. 3,562,172; 3,578,602; 4,215,010; 4,342,668; and 4,440,672.

The precise mechanism for photodecomposition of S.O. dyes is not yet fully understood. Although some circumstantial evidence indicates that oxygen is involved in the photodecomposition process, the traditional antioxidants (aryl amines and hindered phenols) do not improve the light fatigue resistance of S.O. dyes. The conventional UV stabilizers, substituted benzophenones and benzotriazoles, cause a small improvement in the light fatigue resistance of S.O. dyes, but they cannot be used effectively since they create a screening effect by absorbing UV radiation strongly in the region where the S.O. dyes absorb UV radiation. By competing with the S.O. dyes to absorb UV light, these conventional stabilizers substantially decrease the effective light intensity for S.O. dye activation. Furthermore, some of the conventional UV stabilizers are detrimental to S.O. dyes under certain conditions.

In addition, the presence of acids has a deleterious effect on S.O. compounds. Acids may be in the plastic host material from which the photochromic article is made, such as PVC or cellulosics. The acids are usually generated either thermally during the forming process, or photochemically during use of the photochromic article. The S.O. dye solution becomes a pinkish to reddish color in the presence of even a minute amount of acid, and the solution ceases to show a photochromic effect. The pinkish to reddish color is likely due to the formation of a complex between the S.O. compound and acid. A base must be used to neutralize the acid and to restore the original colorless or light blue color.

U.S. Pat. No. 4,440,672, incorporated herein by reference, discloses the use of organonickel complex stabilizers to improve the light fatigue resistance of the photochromic compounds. However, these organonickel complexes do not have the ability to neutralize acids which may be present.

SUMMARY OF THE INVENTION

The problems of the prior art are overcome by the discovery that a group of unconventional UV stabilizers will improve the light-fatigue resistance of S.O. dyes, while not affecting their photocolorability. These unconventional UV stabilizers belong to the class of hindered amine light stabilizers (HALS) and excited state quenchers. Hindered amine light stabilizers offer an advantage over organometallic complex stabilizers in their ability to neutralize acid, and to thus improve the light-fatigue resistance and preserve the original color of the S.O. dyes. It is preferable to use the hindered amine light stabilizers together with excited state quenchers in the organic photochromic compound of the invention; this combination has a synergetic effect in improving the light fatigue resistance of the S.O. compounds.

These UV stabilizers will not hinder the photocolorability of S.O. dyes, since they have a minimal absorption in the UV region where S.O. dyes absorb. The S.O. dye and UV stabilizers may be incorporated within optically clear plastics to make a photochromic element suitable for a photochromic sunglass lens, ski goggle, or other plastics to render them photochromic.

Accordingly, it is an object of the present invention to improve the light fatigue resistance of an organic photochromic composition containing S.O. dye.

It is another object of the present invention to improve the light fatigue resistance of these photochromic compositions without hindering their photocolorability.

It is a further object of the present invention to use such improved photochromic compositions to fabricate photochromic articles such as sunglasses, ophthalmic lenses, ski goggles, window coatings, toys, fabrics, and the like.

Other objects and further scope of applicability of the present invention will become apparent from the detailed description to follow.

DESCRIPTION OF THE PREFERRED EMBODIMENT

The organic photochromic composition of the present invention comprises: (a) spiro [indoline-2,3'-[3H]-naphth [2,1-H] [1,4] oxazine] dye (spirooxazine dye), having the structural formula

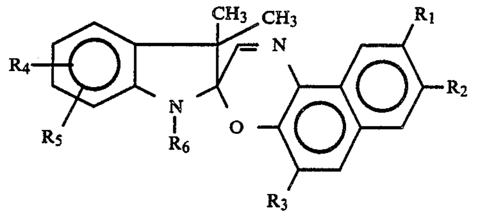

wherein one of $R_1$, $R_2$ and $R_3$ is hydrogen, halogen, lower alkyl, or lower alkoxy and the others are hydrogen; $R_4$ and $R_5$ are hydrogen, lower alkyl, lower alkoxy, halogen, or trifluoromethyl; and $R_6$ is lower alkyl; and, (b) an unconventional UV stabilizer or stabilizers. As used throughout the specification and claims, "lower" means up to 12 carbon atoms (n=1-12) in the free alkyl or alkoxy radical group, wherein the alkyl free radical group has the structural formula of $C_nH_{2n+1}$, and the alkoxy free radical group has the structural formula of $C_nH_{2n+1}O$. Preferably, the UV stabilizer comprises a hindered amine light stabilizer (HALS). The preferred hindered amine light stabilizers comprise derivatives of tetramethyl piperidine. Most preferably, the UV stabilizer comprises a combination of a hindered amine light stabilizer and an excited state quencher. Preferably, the excited state quencher comprises an organonickel complex light stabilizer. For a description of hindered amine light stabilizers and excited state quenchers, see the following four articles in *Modern Plastics Encyclopedia,* which are herein incorporated by reference: (1) Shute, Raymond, "Antioxidants," pp. 102-103 (1983-1984); (2) Li, S. S., "Ultraviolet Stabilizers," pp. 174-177 (1983-1984); (3) Patel, A., "Antioxidants," pp. 106-107 (1984-1985); and (4) Stretanski, J. A., "Ultraviolet Stabilizers," pp. (179-180 (1984-1985).

Between 0.1 and about 15% by weight of the S.O. dye and between 0.01 and about 5% by weight of the HALS stabilizer or combined UV stabilizers, depending on their solubility, can be incorporated into a plastic article having enhanced light fatigue resistance. The SO dye and UV stabilizers may be mixed in a solution with a optically clear polymer which is thereafter cast as a film, sheet, lens, or toy, or a polymer which is injection molded or otherwise shaped into a film or lens; or a prepolymerized film or lens containing the UV stabilizers may be immersed in a dye bath comprising S.O. dye dissolved in a solution of organic solvents such as alcohol, toluene, halogenated hydrocarbon or the like. Other methods of blending the UV stabilizers with the S.O. dye and polymers, such as coating or laminating may also be employed.

One hindered amine light stabilizer, useful in the organic photochromic composition of the invention, comprises the structural formula

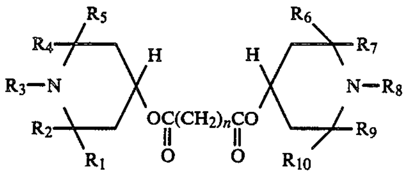

wherein $R_1$, $R_2$, $R_4$, $R_5$, $R_6$, $R_7$, $R_9$ and $R_{10}$ are lower alkyl; $R_3$ and $R_8$ are lower alkyl or hydrogen; and n=1-12; and in particular, the hindered amine light stabilizer is Bis (2,2,6,6-tetramethyl-4-piperidinyl) sebacate, wherein $R_1$, $R_2$, $R_4$, $R_5$, $R_6$, $R_7$, $R_9$ and $R_{10}$ are methyl, $R_3$ and $R_8$ are hydrogen, and n=8, sold under the tradename of Tinuvin 770, and obtained from the Ciba-Geigy Corporation; and also in particular, the hindered amine light stabilizer is Bis (1,2,2,6,6-pentamethyl-4-piperidinyl) sebacate, wherein $R_1$, $R_2$, $R_4$, $R_5$, $R_6$, $R_7$, $R_9$ and $R_{10}$ are methyl, $R_3$ and $R_8$ are methyl, and n=8, sold under the tradename of Tinuvin 765, and obtained from the Ciba-Geigy Corporation.

Another hindered amine light stabilizer which is useful in the organic photochromic composition of the invention comprises the structural formula

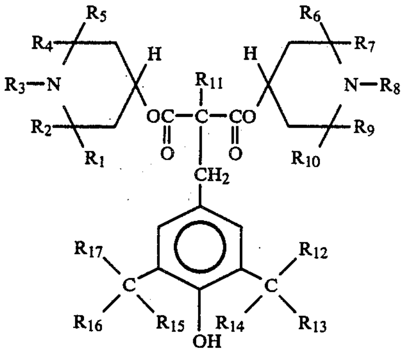

wherein $R_1$, $R_2$, $R_4$, $R_5$, $R_6$, $R_7$, $R_9$, $R_{10}$, $R_{11}$, $R_{12}$, $R_{13}$, $R_{14}$, $R_{15}$, $R_{16}$, and $R_{17}$ are lower alkyl; and $R_3$ and $R_8$ are lower alkyl or hydrogen; and in particular, the hindered amine light stabilizer is di(1,2,2,6,6-pentamethyl-4-piperidinyl)butyl(3',5'-ditertbutyl-4-hydroxybenzyl) malonate, wherein $R_1$, $R_2$, $R_4$, $R_5$, $R_6$, $R_7$, $R_9$, $R_{10}$, $R_{12}$, $R_{13}$, $R_{14}$, $R_{15}$, $R_{16}$, and $R_{17}$ are methyl, $R_{11}$ is butyl, and $R_3$ and $R_8$ are methyl, sold under the tradename of Tinuvin 144, and obtained from the Ciba-Geigy Corporation.

Another hindered amine light stabilizer which is useful in the organic photochromic composition of the invention comprises the structural formula

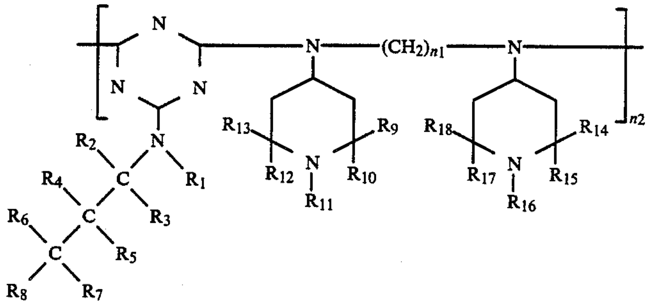

wherein $R_1$, $R_4$, $R_5$, $R_{11}$, and $R_{16}$ are lower alkyl or hydrogen; $R_2$, $R_3$, $R_6$, $R_7$, $R_8$, $R_9$, $R_{10}$, $R_{12}$, $R_{13}$, $R_{14}$, $R_{15}$, $R_{17}$, and $R_{18}$ are lower alkyl; $n_1$=1–12; and $n_2$=1–15; and in particular, the hindered amine light stabilizer is poly[(6-[(1,1,3,3-tetramethylbutyl)amino]-1,3,5-triazine-2,4-diyl)(6-[2,2,6,6-tetra-methyl-4-piperidinyl]amino-hexamethylene)], wherein $R_2$, $R_3$, $R_6$, $R_7$, $R_8$, $R_9$, $R_{10}$, $R_{12}$, $R_{13}$, $R_{14}$, $R_{15}$, $R_{17}$, and $R_{18}$ are methyl, $R_1$, $R_4$, $R_5$, $R_{11}$, and $R_{16}$ are hydrogen, and $n_1$=6, sold under the tradename Chimassorb 944, and obtained from the Ciba-Geigy Corporation.

Another hindered amine light stabilizer which is useful in the organic photochromic composition of the invention comprises the structural formula

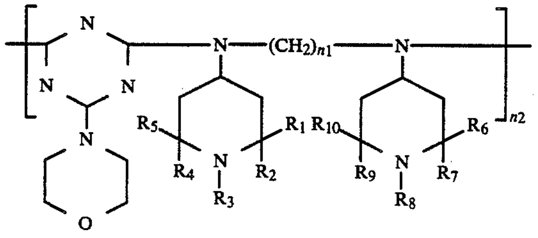

wherein $R_1$, $R_2$, $R_4$, $R_5$, $R_6$, $R_7$, $R_9$, and $R_{10}$ are lower alkyl; $R_3$ and $R_8$ are lower alkyl or hydrogen; $n_1$=1–12; and $n_2$=1–15; and in particular, the hindered amine light stabilizer is poly[[6-(morpholino)-s-triazine-2,4-diyl][16-(2,2,6,6-tetra-methyl-4-piperidyl)amino]hexamethylene], wherein $R_1$, $R_2$, $R_4$, $R_5$, $R_6$, $R_7$, $R_9$, and $R_{10}$ are methyl, $R_3$ and $R_8$ are hydrogen, and $n_1$=6, sold under the tradename Cyasorb 3346, and obtained from the American Cyanamid Corporation.

Another hindered amine light stabilizer which is useful in the organic photochromic composition of the invention comprises the structural formula

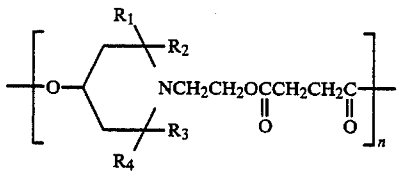

wherein $R_1$, $R_2$, $R_3$, and $R_4$ are lower alkyl; and n=1–15; and in particular, the hindered amine light stabilizer is a dimethyl succinate polymer with 4-hydroxy-2,2,6,6-tetramethyl-1-piperidineethanol, wherein $R_1$, $R_2$, $R_3$ and $R_4$ are methyl, sold under the tradename Tinuvin 622, and obtained from the Ciba-Geigy Corporation.

Other hindered amine light stabilizers which are useful in the organic photochromic composition of the invention include a hindered amine light stabilizer having the structural formula $(C_{26}H_{52}N_4)_n$, wherein n=1–15, sold under the tradename of Spinuvex A-36, and obtained from the Borg-Warner Corporation; and a hindered amine light stabilizer sold under the tradename of Hostavin TMN20, and obtained from the American Hoechst Corporation.

Ultraviolet stabilizers, belonging to the class of excited state quenchers, which are useful in the organic photochromic compound of the invention, include complexes of $Ni^{2+}$ ion with some organic ligand, cobalt (III) tris-di-n-butyldithiocarbamate, cobalt (II) diisopropyldithiocarbamate (Co DIPDTP), and nickel diisopropyldithiophosphate (Ni DIPDTP).

The preferred excited state quenchers are singlet oxygen quenchers, and in particular, complexes of $Ni^{2+}$ ion with some organic ligand. These $Ni^{2+}$ complexes are normally used in polyolefins to provide protection from photodegradation. Most preferably, the $Ni^{2+}$ complexes are: [2,2'-Thiobis [4-(1,1,3,3-tetramethylbutyl) phenolato] (butylamine)] nickel, having the structural formula

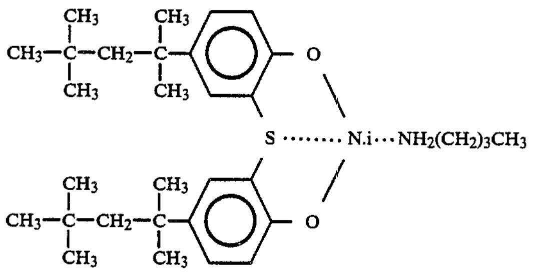

sold under the tradename of Cyasorb UV 1084, and obtained from the American Cyanamid Company; Nickel [0-ethyl (3,5-di-tert-butyl-4-hydroxybenzyl)] phosphonate, having the structural formula

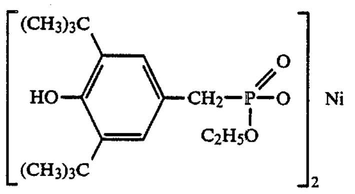

sold under the tradename of Irgastab 2002, and obtained from the Ciba-Geigy Corporation; Nickel dibutyldithiocarbamate, having the structural formula

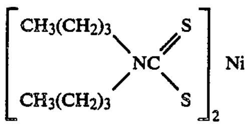

sold under the tradename of Rylex NBC, and obtained from E. I. duPont de Nemours & Company; Bis [2,2'-thiobis-4-(1,1,3,3-tetramethylbutyl) phenolato] nickel, having the structural formula

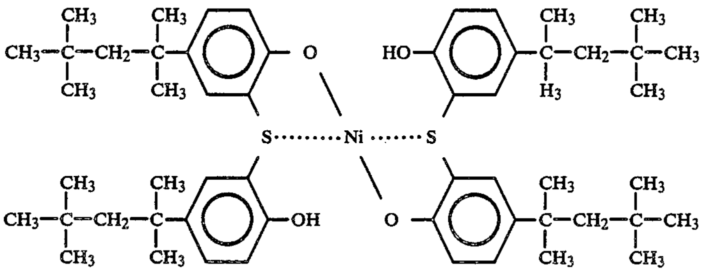

sold under the tradename of UV-Chek AM 101, and obtained the Ferro Corporation; Nickel di-isopropyl dithiophosphate (Ni DIPDTP), having the structural formula

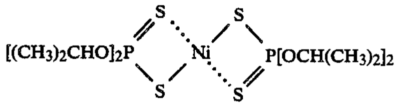

and other $Ni^{2+}$ complexes sold under the tradenames of UV-Chek AM 105, UV-Chek AM 126, and UV-Chek AM 205 which can also be obtained from the Ferro Corporation.

The preferred S.O. dyes for use in accordance with the invention are 1,3,3,4,5-pentamethyl-9'-methoxy-spiro [indoline-2,3'-3H]-naphth [2,1-b] [1,4] oxazine; 1,3,3,5,6-pentamethyl-9'-methoxy-spirooxazine; 1,3,3-trimethyl-5'-methoxy spirooxazine; 1,3,3-trimethyl-5-methoxy spirooxazine; 1,3,3,4,5-pentamethyl-8'-bromo spirooxazine; 1,3,3,5,6-pentamethyl-8'-bromo spirooxazine; 1,2,3,3,4,5-hexamethyl-9'-methoxy spirooxazine; 1,2,3,3,5,6-hexamethyl-9'-methoxy spirooxazine; 1,3,3-trimethyl-4-trifluoromethyl-9'-methoxy spirooxazine; 1,3,3-trimethyl-6-trifluoromethyl-9'-methoxy spirooxazine; 1,3,3-trimethyl-4-trifluoromethyl-5'-methoxy spirooxazine; and 1,3,3-trimethyl-6-trifluoromethyl-5'-methoxy spirooxazine.

The preferred plastic hosts are cellulose acetate butyrate (CAB); CR-39 TM, a diethylene glycol bis (allyl carbonate) obtained from PPG Industries, Inc.; Lexan TM, a polycarbonate resin condensation product of bisphenol-A and phosgene, obtained from General Electric; Plexiglas TM, a polymethyl methacrylate obtained from the Rohm and Haas Company; polyvinyl chloride; and polyolefins.

The invention is further illustrated by the following non-limiting examples.

EXAMPLES 1-8

Eight cellulose acetate butarate (CAB) samples having a thickness of 17-19 mls., containing 0.4% by weight of a mixture of 1,2,3,3,4,5- and 1,2,3,3,5,6-hexamethyl-9'-methoxy S.O. isomers, with and without hindered amine light stabilizers (HALS) were prepared by casting a methylene chloride solution of CAB. Four successive castings were needed to obtain the desired thickness with good optical appearance. The control sample contained no HALS. The seven other samples contained various hindered amine light stabilizers in an arbitrary amount of 0.4% by weight. The samples were subjected to a 20-hour cycle Fadeometer exposure testing. After five cycles, the control sample without HALS lost all its photochromism while the samples with HALS still showed good photochromism. The specific HALS used and the percentage of residual photocolorability of the CAB samples after 100 hours of Fadeometer exposure is shown in Table 1.

TABLE 1

| Percentage of Residual Photocolorability | | |
|---|---|---|
| Example | HALS | Percent Residual Photocolorability |
| Control | None | 0 |
| 2 | Tinuvin 770 | 64 |
| 3 | Tinuvin 765 | 84 |
| 4 | Tinuvin 622 | 31 |
| 5 | Tinuvin 144 | 67 |
| 6 | Chimassorb 944 | 76 |
| 7 | Spinuvex A36 | 90 |
| 8 | Hostavin N20 | 71 |

EXAMPLES 9-10

Two CAB sheet samples (60 mls.) were made by injection molding. One of the CAB sheet samples had 0.2% by weight of a mixture of 1,2,3,3,4,5- and 1,2,3,3,5,6-hexamethyl-9'-methoxy spirooxazine isomers and 0.2% by weight of UV-Chek AM-205 as an excited state quencher. The other sample also had 0.2% by weight Tinuvin 622 as a hindered amine light stabilizer in addition to the S.O. dye and the UV-Chek AM-205. The sample without the HALS lost all of its photochromism after 15 20-hour Fadeometer exposure cycles. However, the sample with the HALS still had 40% of the original photocolorability left.

EXAMPLES 11-13

A control sample was cast at 160° in an oven for 20 minutes from a plastisol solution consisting of 31% diisodecylphthalate, 3% octyl epoxy tallate, 3% mark stabilizer, 63% PVC and 0.1% 1,3,3,4,5- and 1,3,3,5,6-pentamethyl-9'-methoxy S.O. dye mixture. Two more samples were prepared as follows: One sample had, in addition to the ingredients in the control sample, 0.2% by weight UV-Chek AM-205, and the other sample had 0.2% by weight UV-Chek AM-205 and 1.0% by weight Tinuvin 622. The control sample lost all of its photochromic effect after 20 hours of Fadeometer exposure; the sample with UV-Chek AM-205 lasted 80 hours before losing its photochromic effect, and the sample with both UV-Chek AM-205 and Tinuvin 622 lasted 180 hours before losing its photochromic effect.

EXAMPLES 14–18

An ethanol solution of 1,3,3-trimethyl S.O. dye was prepared by dissolving 13.1 mg of dye in 100.0 ml of ethanol. Two milliters of the solution was placed in each of five 10.0 ml volumetric flasks. Then, 0.01 ml of 1N HCl was added to each flask and each solution was diluted with ethanol to 10.0 ml. Each solution was originally colorless but became pinkish and lost its photochromic effect once the HCl was added. To four of the solutions was added about 3 mg of either Tinuvin 770, Tinuvin 765, Cyasorb 1084 or UV-Chek AM-205. The solutions containing the Tinuvin and Cyasorb compounds reverted to colorless solutions and regained their photochromic effect, while the other solutions remained pinkish and showed no photochromic effect.

Although the invention has been described with reference to its preferred embodiment, other embodiments can achieve the same results. Variations and modifications of the present invention will be obvious to those skilled in the art and it is intended to cover in the appended claims all such modifications and equivalents.

I claim:

1. A photochromic composition comprising at least one photochromic compound having the structural formula

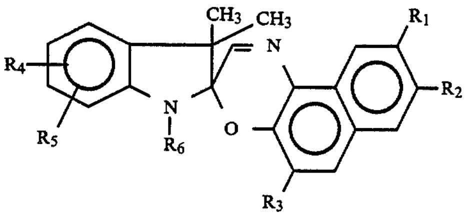

wherein one of $R_1$, $R_2$ and $R_3$ is selected from the group consisting of hydrogen, halogen, lower alkoxy, and lower alkyl and the others are hydrogen; $R_4$ and $R_5$ are selected from the group consisting of hydrogen, lower alkyl, lower alkoxy, halogen, and trifluoromethyl; and $R_6$ is lower alkyl; and a hindered amine light stabilizer.

2. A composition according to claim 1 additionally comprising a singlet oxygen quencher ultraviolet stabilizer.

3. A composition according to claim 2 wherein said singlet oxygen quencher ultraviolet stabilizer is a $Ni^{2+}$ ion complex with an organic ligand.

4. A composition according to claim 2 wherein said singlet oxygen quencher ultraviolet stabilizer is selected from [2,2'-thiobis [4-(1,1,3,3-tetramethylbutyl)-phenolato] (butylamine)] nickel, nickel [0-ethyl(3,5-di-tert-butyl-4-hydroxybenzyl)] phosphonate, nickel dibutyldithiocarbamate, nickel di-isopropyl dithiophosphate, bis [2,2'-thiobis-4-(1,1,3,3-tetramethylbutyl)-phenolato] nickel, cobalt (III) tris-di-n-butyldithiocarbamate, and cobalt (II) diisopropyldithiocarbamate.

5. A spirooxazine photochromic composition having incorporated therein a hindered amine light stabilizer to increase the light fatigue resistance thereof.

6. A composition according to claim 5, 1, 2, 3 or 4 wherein said hindered amine light stabilizer is selected from one or more compounds of the following formulae:

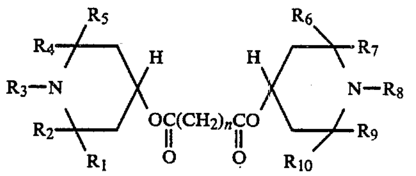

wherein $R_1$, $R_2$, $R_4$, $R_5$, $R_6$, $R_7$, $R_9$, and $R_{10}$ are lower alkyl, $R_3$ and $R_8$ are selected from lower alkyl and hydrogen, and n is 1–12;

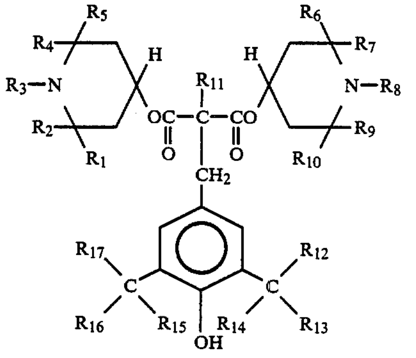

wherein $R_1$, $R_2$, $R_4$, $R_5$, $R_6$, $R_7$, $R_9$, $R_{10}$, $R_{11}$, $R_{12}$, $R_{13}$, $R_{14}$, $R_{15}$, $R_{16}$ and $R_{17}$ are lower alkyl, and $R_3$ and $R_8$ are selected from lower alkyl and hydrogen;

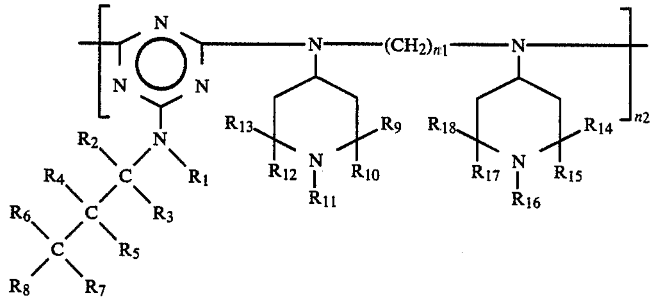

wherein $R_1$, $R_4$, $R_5$, $R_{11}$ and $R_{16}$ are selected from lower alkyl and hydrogen, $R_2$, $R_3$, $R_7$, $R_8$, $R_9$, $R_{10}$, $R_{12}$, $R_{13}$, $R_{14}$, $R_{15}$, $R_{17}$ and $R_{18}$ are lower alkyl; $n_1$ is 1–12, and $n_2$ is 1–15;

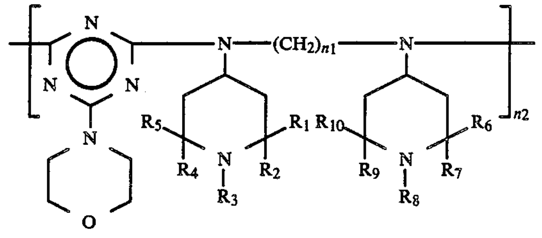

wherein $R_1$, $R_2$, $R_4$, $R_5$, $R_6$, $R_7$, $R_9$, and $R_{10}$ are lower alkyl, $R_3$ and $R_8$ are selected from lower alkyl and hydrogen, $n_1$ is 1–12 and $n_2$ is 1–15;

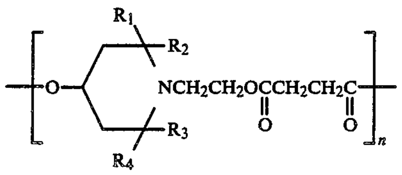

wherein $R_1$, $R_2$, $R_3$, and $R_4$ are lower alkyl, and n is 1–15; and $(C_{26}H_{52}N_4)_n$ wherein n is 1–15.

7. A composition according to claim 6 wherein said hindered amine light stabilizer is selected from one or more of bis(2,2,6,6-tetramethyl-4-piperidinyl) sebacate; bis(1,2,2,6,6-pentamethyl-4-piperidinyl) sebacate; di(1,2,2,6,6-pentamethyl-4-piperdinyl)-butyl(3′,5′-ditertbutyl-4-hydroxybenzyl)malonate; poly[(6-[(1,1,3,3-tetramethylbutyl)amino]1,3,5-triazine-2,4-diyl)(1,6-[2,2,6,6-tetramethyl-4-piperidinyl] amino-hexamethylene)]; poly[[6-(morpholino)-s-triazine-2,4-diyl] [1,6-(2,2,6,6-tetramethyl-4-piperidyl) amino]-hexamethylene]; and dimethyl succinate polymer with 4-hydroxy-2,2,6,6-tetramethyl-1-piperidineethanol.

8. A composition according to claim 6 additionally comprising a plastic host.

9. A composition according to claim 8 containing about 0.1% to about 15% by weight of said photochromic compound and about 0.01% to about 5% by weight of said stabilizer or stabilizers.

10. A method of increasing the light fatigue resistance of a spirooxazine photochromic composition which comprises incorporating in said composition a hindered amine light stabilizer.

11. A method according to claim 10 wherein said photochromic composition additionally contains a singlet oxygen quencher ultraviolet stabilizer.

12. A method according to claim 11 wherein said singlet oxygen quencher ultraviolet stabilizer is a $Ni^{2+}$ ion complex with an organic ligand.

13. A method according to claim 11 wherein said singlet oxygen quencher ultraviolet stabilizer is selected from [2,2′-thiobis [4-(1,1,3,3-tetramethylbutyl) phenolato] (butylamine)] nickel, nickel [0-ethyl(3,5-di-tert-butyl-4-hydroxybenzyl)] phosphonate, nickel dibutyldithiocarbamate, nickel di-isopropyl dithiophosphate, bis [2,2′-thiobis-4-(1,1,3,3-tetramethylbutyl) phenolato] nickel, cobalt (III) tris-di-n-butyldithiocarbamate, and cobalt (II) diisopropyldithiocarbamate.

14. A method according to claim 13 wherein said photochromic composition comprises a polymer containing about 0.1% to about 15% by weight spirooxazine photochromic dye.

15. A method according to claim 14 wherein said hindered amine light stabilizer and said singlet oxygen quencher ultraviolet stabilizer are incorporated in said photochromic composition in a total amount of about 0.01% to about 5% by weight.

16. A method according to claim 15 wherein said hindered amine light stabilizer is a tetramethyl piperidine derivative.

17. A method according to claims 10, 11, 12, 13, 14 or 15 wherein said hindered amine light stabilizer is selected from one or more compounds of the following formulae:

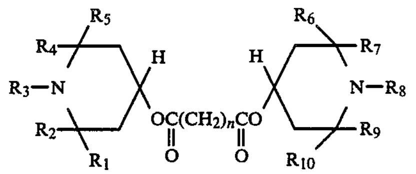

wherein $R_1$, $R_2$, $R_4$, $R_5$, $R_6$, $R_7$, $R_9$, and $R_{10}$ are lower alkyl, $R_3$ and $R_8$ are selected from lower alkyl and hydrogen, and n is 1–12;

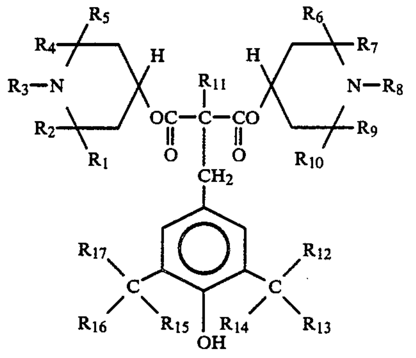

wherein $R_1$, $R_2$, $R_4$, $R_5$, $R_6$, $R_7$, $R_9$, $R_{10}$, $R_{11}$, $R_{12}$, $R_{13}$, $R_{14}$, $R_{15}$, $R_{16}$ and $R_{17}$ are lower alkyl, and $R_3$ and $R_8$ are selected from lower alkyl and hydrogen;

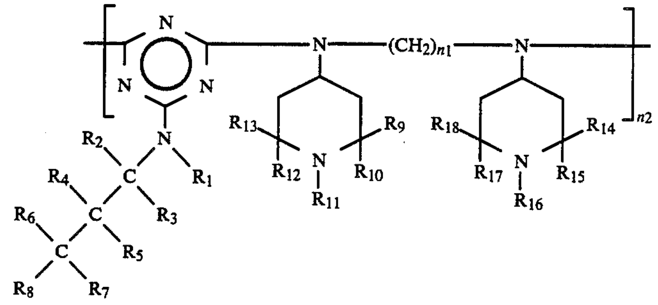

wherein $R_1$, $R_4$, $R_5$, $R_{11}$ and $R_{16}$ are selected from lower alkyl and hydrogen, $R_2$, $R_3$, $R_7$, $R_8$, $R_9$, $R_{10}$, $R_{12}$, $R_{13}$, $R_{14}$, $R_{15}$, $R_{17}$ and $R_{18}$ are lower alkyl; $n_1$ is 1-12, and $n_2$ is 1-15;

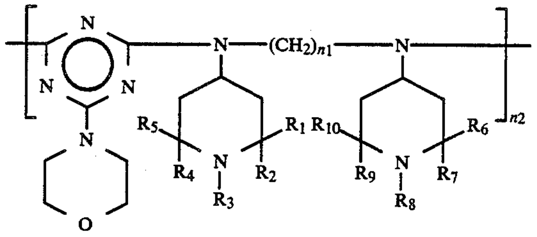

wherein $R_1$, $R_2$, $R_4$, $R_5$, $R_6$, $R_7$, $R_9$, and $R_{10}$ are lower alkyl, $R_3$ and $R_8$ are selected from lower alkyl and hydrogen, $n_1$ is 1-12 and $n_2$ is 1-15;

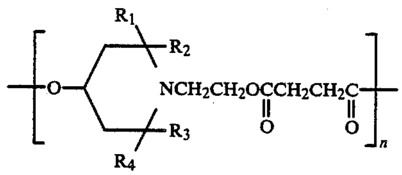

wherein $R_1$, $R_2$, $R_3$, and $R_4$ are lower alkyl, and n is 1-15; and $(C_{26}H_{52}N_4)_n$ wherein n is 1-15.

18. A method according to claim 17 wherein said photochromic composition contains one or more of a spirooxazine photochromic dye of the formula

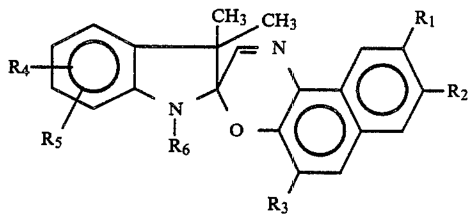

wherein one of $R_1$, $R_2$ and $R_3$ is selected from the group consisting of hydrogen, halogen, lower alkoxy, and lower alkyl and the others are hydrogen; $R_4$ and $R_5$ are selected from the group consisting of hydrogen, lower alkyl, lower alkoxy, halogen, and trifluoromethyl; and $R_6$ is lower alkyl.

19. A method according to claim 18 wherein said hindered amine light stabilizer is selected from one or more of bis (2,2,6,6-tetramethyl-4-piperidinyl) sebacate; bis (1,2,2,6,6-pentamethyl-4-piperidinyl) sebacate; di(1,2,2,6,6-pentamethyl-4-piperidinyl)-butyl(3',5'-diterbutyl-4-hydroxybenzyl) malonate; poly[(6-[(1,1,3,3-tetramethylbutyl)amino]-1,3,5-triazine-2,4-diyl)(1,6-[2,2,6,6-tetramethyl-4-piperidinyl] amino-hexamethylene)]; poly[[6-(morpholino)-s-triazine-2,4-diyl] [1,6-(2,2,6,6-tetramethyl-4-piperidyl) amino]-hexamethylene]; and dimethyl succinate polymer with 4-hydroxy-2,2,6,6-tetramethyl-1-piperidineethanol.

* * * * *